(12) United States Patent
Matmour et al.

(10) Patent No.: US 10,889,676 B2
(45) Date of Patent: Jan. 12, 2021

(54) METHOD FOR SYNTHESIZING A THERMOPLASTIC ELASTOMER COMPRISING AT LEAST ONE POLY(α-METHYLSTYRENE) BLOCK

(71) Applicant: COMPAGNIE GENERALE DES ETABLISSEMENTS MICHELIN, Clermont-Ferrand (FR)

(72) Inventors: Rachid Matmour, Clermont-Ferrand (FR); Robert Ngo, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 135 days.

(21) Appl. No.: 16/063,988

(22) PCT Filed: Dec. 8, 2016

(86) PCT No.: PCT/FR2016/053275
§ 371 (c)(1),
(2) Date: Jun. 19, 2018

(87) PCT Pub. No.: WO2017/109325
PCT Pub. Date: Jun. 29, 2017

(65) Prior Publication Data
US 2019/0077900 A1 Mar. 14, 2019

(30) Foreign Application Priority Data
Dec. 21, 2015 (FR) ..................................... 15 62986

(51) Int. Cl.
| | |
|---|---|
| *C08F 297/04* | (2006.01) |
| *B60C 1/00* | (2006.01) |
| *C08F 236/10* | (2006.01) |
| *C08F 236/06* | (2006.01) |
| *C08F 136/06* | (2006.01) |
| *C08K 5/56* | (2006.01) |
| *C08L 9/06* | (2006.01) |

(52) U.S. Cl.
CPC .............. *C08F 297/04* (2013.01); *B60C 1/00* (2013.01); *C08F 136/06* (2013.01); *C08F 236/06* (2013.01); *C08F 236/10* (2013.01); *C08F 297/042* (2013.01); *C08K 5/56* (2013.01); *C08L 9/06* (2013.01)

(58) Field of Classification Search
CPC ................ C08F 297/04; C08F 297/042; C08F 236/02–10
See application file for complete search history.

(56) References Cited

U.S. PATENT DOCUMENTS

| | | | |
|---|---|---|---|
| 431,777 A | 7/1890 | Miller | |
| 3,925,512 A * | 12/1975 | Roest | .................. C08F 297/046 525/271 |
| 4,086,499 A * | 4/1978 | Mishra | .................. H01G 7/023 307/400 |
| 4,461,874 A | 7/1984 | Teyssié et al. | |
| 4,525,532 A | 6/1985 | Tung et al. | |
| 6,613,858 B1 * | 9/2003 | Sasagawa | ............... C08F 36/04 260/665 R |
| 2006/0252896 A1 | 11/2006 | Longeau et al. | |

FOREIGN PATENT DOCUMENTS

| | | | |
|---|---|---|---|
| EP | 0014947 A1 | 9/1980 | |
| EP | 0135169 A2 | 3/1985 | |
| GB | 1189767 A * | 4/1970 | ........... C08G 81/022 |
| WO | 2004090001 A1 | 10/2004 | |

OTHER PUBLICATIONS

International Search Report (PCT/ISA/210) for PCT/FR2016/053275 dated Mar. 3, 2017.

* cited by examiner

Primary Examiner — Kregg T Brooks
(74) Attorney, Agent, or Firm — Dickinson Wright PLLC

(57) ABSTRACT

A method for synthesizing a thermoplastic elastomer comprising at least one polydiene block and at least one other poly(α-methylstyrene) block comprises:
polymerizing at least one diene monomer in a starting reaction medium comprising an anionic polymerization initiator and an aprotic non-polar solvent;
polymerizing α-methylstyrene to the living polydiene chain obtained in the preceding step comprising:
maintaining the reaction medium containing the living diene elastomer obtained previously and α-methylstyrene at a positive temperature, below the ceiling temperature for the polymerization of α-methylstyrene;
cooling the reaction medium obtained at the end of step a., to a temperature below 0° C.;
simultaneously, successively or prior to the cooling step, adding a purified aprotic polar solvent to the reaction medium with a volume ratio of the polar solvent to the non-polar solvent of less than 1; and
propagating the polymerization of α-methylstyrene to the living polydiene chain.

20 Claims, No Drawings

METHOD FOR SYNTHESIZING A THERMOPLASTIC ELASTOMER COMPRISING AT LEAST ONE POLY(α-METHYLSTYRENE) BLOCK

This application is a 371 national phase entry of PCT/FR2016/053275 filed on 8 Dec. 2016, which claims benefit of French Patent Application No. 1562986, filed 21 Dec. 2015, the entire contents of which are incorporated herein by reference for all purposes.

BACKGROUND

1. Technical Field

The present invention relates to a method for synthesizing a block copolymer of thermoplastic elastomer type, at least one of the blocks being a diene elastomer and at least one other of the blocks consists of poly(α-methylstyrene)

2. Related Art

Thermoplastic elastomers (TPEs) are elastomers which are of great interest in many fields because of their combined properties associated, on the one hand, with the elastomeric block and, on the other hand, with the thermoplastic rigid block. This rigid phase softens until melting for temperatures exceeding the glass transition temperature (Tg) or the melting point (Tm) of the thermoplastic block, and becomes rigid again when the temperature returns to ambient temperature. This particularity of the TPE implies a very broad application potential.

Among the most widely used thermoplastic elastomers are copolymers comprising styrene blocks. In point of fact, the glass transition temperature of the polystyrene blocks is around 80° C. to 100° C. depending on the size of the styrene blocks. For some applications, the value of the glass transition temperature of the polystyrene blocks is insufficient. This is because this value does not make it possible to envisage the use of these TPEs for the production of certain objects subjected in particular to specific working conditions where the temperatures exceed 100° C.

It can therefore prove to be necessary to replace the polystyrene rigid blocks with rigid blocks having a glass transition temperature above 100° C. A solution envisaged in the prior art is to replace the polystyrene with poly-(α)-methylstyrene, the glass transition temperature of which is around 168° C.

Several synthesis routes can make it possible to polymerize α-methylstyrene, such as cationic, radical and anionic polymerization. Nevertheless, regardless of the route taken, the polymerization of α-methylstyrene is always limited by a reaction equilibrium which depends both on the ceiling temperature of polymerization and on the concentration of α-methylstyrene.

In the past, the literature has described many syntheses of TPEs comprising thermoplastic blocks based on α-methylstyrene, with the aim of improving the heat resistance of styrene TPE.

WO 2007/112232A2 describes the three-step synthesis of a TPE based on α-methylstyrene. The first step consists of anionic polymerization of α-methylstyrene in a concentrated medium in the presence of styrene, at high temperature (70° C.) and in the presence of diethyl ether in a first reactor. The continuous addition of styrene, at a controlled flow rate, during the polymerization in the first reactor makes it possible to have a statistical distribution of the styrene/α-methylstyrene units and to reach degrees of conversion of 97% for α-methylstyrene and of 100% for styrene. In the second reactor, butadiene is polymerized in the presence of the living poly(styrene-co-α-methylstyrene) chains. The third step consists of the terminating of the polymerization by reaction with an alkoxysilane coupling agent making it possible to generate the triblock copolymer.

Other documents, such as WO 8505116, EP 0 014 947 A1 and EP 0 135 169 A2, describe the synthesis of α-methylstyrene-based thermoplastic elastomers. In order to achieve a high degree of conversion of α-methylstyrene, the latter is copolymerized with styrene by the anionic route in order to generate the thermoplastic block. In order to obtain the triblock copolymer of poly(α-methylstyrene-co-styrene)-polydiene-poly(α-methylstyrene-co-styrene) type, the synthesis is carried out in the presence of a bifunctional initiator and at high temperature (above 50° C.). The copolymerization of the α-methylstyrene and styrene is initiated by a polybutadienyldilithium chain obtained in a previous step, and carried out in the presence of α-methylstyrene in one or two steps by subsequent addition of styrene.

The counterpart of these methods which favour a high degree of conversion of α-methylstyrene using styrene as co-monomer is that the Tg of the thermoplastic blocks, which is admittedly above that of a styrene homopolymer, remains much lower than that of poly(α-methylstyrene) and sometimes below some working temperatures of materials based on a thermoplastic elastomer.

In U.S. Pat. No. 4,302,559, attention is paid to the synthesis of block copolymer based on butadiene and on α-methylstyrene. During the first polymerization step, the α-methylstyrene is polymerized at 30° C. for 30 min in the presence of THF, but is not completely converted. In a second step, a portion of the butadiene is added and polymerized at 30° C. for 30 min in order to obtain a polybutadienyllithium chain end so as to prevent depolymerisation of the α-methylstyrene. The addition of potassium tert-amylate and the other portion of the butadiene, in a third step, makes it possible to insert the residual α-methylstyrene statistically. The α-methylstyrene conversion can reach 80%. In order to obtain a copolymer comprising blocks with poly(α-methylstyrene) side blocks, the polymer is coupled by means of silicone tetrachloride. It should be noted that the polymer obtained is not, strictly speaking, a triblock copolymer. This is because the polydiene central block itself consists of three blocks forming polybutadiene-poly(butadiene-co-α-methylstyrene)-polybutadiene.

The counterpart of this method is that it does not produce a perfectly triblock poly(α-methylstyrene)-polydiene-poly (α-methylstyrene) thermoplastic elastomer, and that produced has thermomechanical properties which are not as good as those of perfectly well-defined TPE such as poly (α-methylstyrene)-polydiene-poly(α-methylstyrene).

The anionic polymerization routes for forming an α-methylstyrene-based thermoplastic block of a thermoplastic elastomer are therefore limited by the need to copolymerize this monomer with others for the purpose of achieving sufficient degrees of conversion. In the absence of these co-monomers, the degree of conversion results in a non-optimized productivity of the synthesis method. In addition, the unconverted monomer must be extracted and recycled. Such a treatment carried out on large volumes of unconverted monomer makes this type of method unattractive because of its economic impact on the costs of the method. Moreover, the presence of the comonomer has an impact on the thermomechanical properties of the thermoplastic elastomer.

It is known to those skilled in the art that the addition of products, of reagents or of solvents during an anionic polymerization process is a major source of introduction of impurities, in particular protic impurities, into the reaction medium. The consequence of this introduction is the premature termination of the polymerization due to reaction of these protic impurities with the living polymer chains. The risk increases with the volumes of substances added.

Thus, another difficulty which generally preoccupies designers of block copolymers using sequenced anionic polymerization is the addition of the reagents and solvents required for the successive polymerizations using the living blocks already formed by the preceding polymerization(s) as macroinitiating agents for the propagation of the subsequent polymerizations, with the intention of forming the other blocks. Indeed, in order to obtain a thermoplastic elastomer with satisfactory thermomechanical properties, it is advisable to avoid a heterogeneous composition of species generated, such as homopolymers, diblock or even triblock copolymers, of more or less homogeneous length, due to a premature or uncontrolled termination of the polymerization. Such an assortment has a significant impact on the thermomechanical properties of the thermoplastic elastomer. This difficulty is increased when the number of successive polymerizations increases or else with the polyfunctionality of the macroinitiating agents.

Added to this difficulty is the risk of forming mixtures of polymer species due to the difficulty of a homogeneous initiating on the first living blocks before the propagation of the polymerization intending to form the second blocks. This difficulty is increased when the first living block comprises two or more active sites and when the reaction medium is of high viscosity.

The homogeneity of initiating and of chain growth can be assessed by means of the distribution of the number molecular weights. Said distribution must be narrow in order to guarantee satisfactory thermomechanical properties of the block copolymer such as the thermoplastic elastomer.

SUMMARY

In the light of the prior art synthesis methods, the aim of the present invention is to provide an economically advantageous method for synthesizing a thermoplastic block elastomer, the thermoplastic block(s) of which are poly(α-methylstyrene)s, also having an increased productivity, in particular by making it possible to achieve a high degree of conversion of α-methylstyrene. This method must make it possible to provide thermoplastic elastomers with a low polydispersity and having a controlled structural composition, the thermoplastic blocks of which have a high glass transition temperature, above certain working temperatures of materials based on such elastomers.

In the prior art, the initiating and the propagating of the polymerization of the styrene monomer for the purpose of synthesizing a thermoplastic elastomer can be carried out starting from a living elastomer at a ceiling temperature below that of α-methylstyrene, but which is still positive, and in the same solvent as the polymerization of diene, namely an aprotic non-polar solvent.

The inventors have been able to demonstrate, against all expectations, that the anionic polymerization of α-methylstyrene to a living polydiene can be carried out homogeneously at a temperature below 0° C. and in the presence of an aprotic polar co-solvent, while achieving a high degree of conversion of the α-methylstyrene, in particular above 80%. The fact that the carbon-lithium sites, with which the living polydiene chains are provided, are equally reactive during the subsequent polymerization of the α-methylstyrene, and that the propagation thereof is homogeneous, is all the more unexpected since the viscosity of the medium is high, especially at such low temperatures.

Thus, surprisingly, the method of the invention makes it possible to synthesize a thermoplastic elastomer of controlled microstructure and controlled macrostructure with a narrow molecular weight distribution, in particular with a polydispersity index which is usually much lower than 2, or even than 1.3, which is an indication, on the one hand, of a homogeneous polymerization of the α-methylstyrene and, on the other hand, of a control of the triblock copolymer species generated. Moreover, the thermoplastic block(s) are α-methylstyrene homopolymers and can therefore have a glass transition temperature above the glass transition temperature of polystyrene. The method of the invention makes it possible to synthesize a thermoplastic elastomer comprising poly(α-methylstyrene) blocks with an increased productivity that is economically compatible with industrial exploitation.

Patent application FR2852960A1 describes a homopolymerization of α-methylstyrene by anionic polymerization at a high concentration, at low temperature and in the presence of a monofunctional initiator and of a large amount of polar co-solvent with a volume ratio to the non-polar co-solvent of 18%. Under these conditions, the conversion of the monomer is greater than 90%. Under these conditions, the method makes it possible, moreover, to control the molar mass and also the polydispersity index of the poly(α-methylstyrene). However, it should be noted that, in the context of this application, it is a question of homopolymerization with an initiation by means of an initiator of very low molecular weight and of single functionality. In addition, in the context of this method, there is no mention, or even a suggestion, of an adaptability of the method to copolymerization and, what is more, to fragmentation copolymerization, for the purpose of producing blocks, and to the difficulties associated therewith.

Thus, the objective of the present invention and other objectives are achieved by means of a method for synthesizing a thermoplastic elastomer of block copolymer type, at least one of the blocks of which is a diene elastomer and at least one other block of which is a poly(α-methylstyrene) homopolymer which consists in polymerizing α-methylstyrene starting from "living" anionic chains of diene polymers at a temperature below 0° C. and in the presence of an aprotic polar co-solvent.

A subject of the invention is therefore this method for synthesizing a thermoplastic elastomer comprising the following steps:

1. of polymerizing at least one diene monomer in a starting reaction medium comprising an anionic polymerization initiator and an aprotic non-polar solvent;
2. of polymerizing α-methylstyrene to the living polydiene chain obtained in the preceding step comprising:
   a. at the end of the polymerization of the at least one diene monomer, maintaining the reaction medium containing the living diene elastomer obtained previously and α-methylstyrene at a positive temperature, below the ceiling temperature for the polymerization of α-methylstyrene;
   b. cooling the reaction medium containing the living polyethene obtained previously, to a temperature below 0° C.;
   c. simultaneously, successively or prior to the cooling step, adding an aprotic polar solvent to the reaction medium with a volume ratio of the polar solvent to the non-polar solvent of less than 1; and d. propagating the polymerization of α-methylstyrene to the living polydiene chain;

3. of terminating the polymerization and recovering the thermoplastic polymer.

Another subject of the invention is a rubber composition comprising a block thermoplastic copolymer obtained by means of such a method.

A subject of the invention is also a tire casing incorporating such a composition.

DETAILED DESCRIPTION OF EXAMPLE EMBODIMENTS

In the description, the expression "initiating" in relation to the polymerization of the α-methylstyrene is intended to mean the forming of new α-methylstyrenyl active centres on the active ends of the living elastomer chains.

In the description, the expressions "initiating agent" and "initiator" are used as having the same meaning, without distinction. The same is true for the expressions "initiating" and "initiation".

In the description, the expressions "diene elastomer" and "polydiene" are used as having the same meaning, without distinction.

In the description, the expression "polydispersity index" or "PDI", is intended to mean the ratio of the weight-average molecular weight to the number-average molecular weight of the thermoplastic elastomer. The closer the PDI value is to 1, the narrower is the molecular weight distribution.

In the description, the term "living" is used in order to describe the capacity of the polymer chain ends to maintain their reactivity for a sufficiently long period of time to allow the polymerization without termination and transfer reactions.

In the description, the expression "ambient temperature" is intended to mean a temperature varying between 20° C. and 30° C.

In the description, unless expressly indicated otherwise, all the percentages (%) indicated are % by weight. Furthermore, any range of values denoted by the expression "between a and b" represents the range of values going from more than a to less than b (that is to say limits a and b excluded), whereas any range of values denoted by the expression "from a to b" means the range of values going from a up to b (that is to say including the strict limits a and b). In the present application, when a range of values is denoted by the expression "from a to b", the range represented by the expression "between a and b" is likewise and preferentially denoted.

In the context of embodiments of the invention, the carbon-based products mentioned in the description may be of fossil or biobased origin. In the latter case, they may be partially or totally derived from biomass or obtained from renewable raw materials derived from biomass.

The first step of the method according to embodiments of the invention consists of the polymerization of at least one diene monomer in a starting reaction medium, comprising an anionic polymerization initiator and an aprotic non-polar solvent. This step makes it possible to produce a living diene polymer, that is to say living chains which have one or more active ends in the form of a carbanion.

The polymerization of the diene monomer can be carried out in a known manner continuously or batchwise. The polymerization is generally carried out at a temperature of between 20° C. and 120° C. and preferably ranging from 30° C. to 90° C.

The diene monomer according to the invention may be selected from conjugated diene monomers having from 4 to 12 carbon atoms. The following are in particular suitable as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene and 2,4-hexadiene. The diene monomer is preferentially 1,3-butadiene or 2-methyl-1,3-butadiene.

According to variants of the invention, the diene monomer can be copolymerized with at least a second monomer different from the first monomer and selected from monomers which can be polymerized by anionic polymerization. Mention may in particular be made of conjugated dienes, non-conjugated dienes, vinyl monomers and vinyl aromatic monomers.

The vinyl aromatic monomers according to embodiments of the invention may be selected from vinyl aromatic monomers having from 8 to 20 carbon atoms, for instance styrene, ortho-, meta-, para-methylstyrene, the commercial mixture vinylmesitylene, divinylbenzene and vinylnaphthalene.

Preferentially, when the diene monomer is copolymerized with at least a second monomer different from the first monomer and selected from conjugated dimes, said monomer is 1,3-butadiene or 2-methyl-1,3-butadiene.

Preferentially, when the diene monomer is copolymerized with at least a second monomer different from the first monomer and selected from vinyl aromatic monomers, said monomer is styrene.

In addition to the diene monomer and optionally at least one other monomer, the starting reaction medium comprises a non-polar aprotic solvent.

The expression "non-polar aprotic solvent" is intended to mean, according to embodiments of the invention, an inert hydrocarbon-based solvent which can for example be an aliphatic or alicyclic hydrocarbon, such as pentane, hexane, heptane, isooctane, cyclohexane or methylcyclohexane, or an aromatic hydrocarbon such as benzene, toluene or xylene, or mixtures of these solvents.

In addition to the diene monomer and optionally at least one other monomer, and also the non-polar aprotic solvent, the starting reaction mixture also comprises an anionic polymerization initiator.

The polymerization initiator according to embodiments of the invention makes it possible to initiate the anionic polymerization of diene monomers in order to prepare the living diene elastomers. As polymerization initiator, use may be made of any known monofunctional or polyfunctional anionic initiator, that is to say which has one or more active centres. Mention may be made of those containing an alkali metal such as lithium, sodium or potassium. However, an initiator containing lithium is preferentially used. Particularly suitable organolithium initiators are those comprising one or more carbon-lithium bonds. Representative compounds are aliphatic or aromatic organolithiums, such as ethyllithium, n-butyllithium (n-BuLi), isobutyllithium, alkyldilithiums such as 1,4-dilithiobutane or 1,4-dilithiotetraphenylbutane, or else dilithium initiators resulting from the reaction of s-butyllithium with dialkenylbenzenes as described in patent EP 1 237 941 B1. Among the latter, the reaction adduct resulting from a molecule of s-butyllithium on each of the two double bonds borne by 1,3-diisopropé- nylbenzene, that is to say 1,3-diisopropylbenzene dilithium, is preferred. Also suitable as organolithium initiators are those comprising one or more nitrogen-lithium bonds. Among these, mention may be made of lithium amides obtained from a cyclic secondary amine, in particular pyrrolidine and hexamethyleneimine.

The living diene elastomers can have any microstructure, which depends on the polymerization conditions used, in particular on the presence or absence of a modifying and/or randomizing agent in the reaction medium and on the amounts of modifying and/or randomizing agent used. The diene elastomers can for example be block, random, sequenced or microsequenced elastomers.

The living diene elastomers can be linear or star-shaped; they can have one or more active ends in the form of carbon-lithium bonds. The living diene elastomer is preferably linear, more preferentially its two chain ends are active.

According to advantageous variants of the invention, at least one of the following characteristics is observed for the first step of the method, and preferably all of them:
 the diene monomer is butadiene,
 where appropriate, the co-monomer is styrene and
 the anionic polymerization initiator comprises two carbon-lithium bonds, and is preferably 1,3-diisopropenylbenzyllithium.

According to the method of embodiments of the invention, the next step consists of the polymerization of α-methylstyrene to the living diene elastomer previously obtained.

According to certain variants of the invention, the α-methylstyrene is present in the starting reaction medium.

According to other variants of the invention, the α-methylstyrene is added to the reaction medium following the step of polymerizing at least one diene monomer. In this case, the α-methylstyrene added is conventionally purified so as not to introduce into the reaction medium impurities which might react with the living chains and create dead chains. These variants are particularly advantageous, since there can be no possible interaction of the α-methylstyrene with the living diene chains during the polymerization of the diene monomer. Preferentially, an aliphatic organolithium, more particularly n-butyllithium (n-BuLi) will be used, in order to neutralize the impurities of the α-methylstyrene added.

At the end of the step of polymerizing at least one diene monomer, the reaction medium containing the living diene elastomer is maintained at a temperature below the ceiling temperature of α-methylstyrene in the presence of α-methylstyrene for a period of time sufficient to homogeneously initiate the polymerization of the α-methylstyrene to the active centres of the living diene elastomer.

Advantageously, the reaction medium is maintained at ambient temperature.

The reaction medium can be maintained at a reduced temperature, advantageously at ambient temperature, for a period of time varying from 1 minute, preferably from 15 minutes, more particularly from 1 hour, to 4 hours, more particularly to 3 hours. The initiating of the α-methylstyrene polymerization is generally accompanied by a modification of the coloration of the reaction medium, which allows those skilled in the art to determine the time required for this step.

After this period of time for bringing the living diene elastomer and the α-methylstyrene into contact, the reaction medium previously obtained is cooled to a temperature below 0° C. Preferably, the reaction medium is cooled to a temperature above or equal to −50° C., preferentially above or equal to −40° C., and below or equal to −10° C., preferentially below or equal to −20° C.

Simultaneously with or sequentially to this cooling step, a polar aprotic solvent is added to the reaction medium in a volume amount less than that of the non-polar aprotic solvent. The volume ratio of the polar solvent to the non-polar solvent is therefore less than 1. Preferably, this volume ratio of the polar solvent to the non-polar solvent is less than or equal to 1/3. The amount of polar solvent is preferentially at least 10% by volume relative to the total volume of solvent.

The expression "polar aprotic solvent" is intended to mean, according to the embodiments of invention, an inert solvent which has a dipolar moment, without acidic hydrogen atom. Moreover, this polar solvent must be miscible with the non-polar solvent used for the step of polymerizing the diene monomer, at the temperature of the reaction medium in which it is present.

By way of polar aprotic solvent according to embodiments of the invention, mention may for example be made of thioethers and ethers, in particular cyclic ethers, among which are tetrahydrofuran (THF) and tetrahydropyran.

According to variants of the invention, when the polar aprotic solvent is added to the reaction medium sequentially to the cooling step, the addition is carried out before the step of cooling the reaction medium to a temperature below 0° C.

According to other variants of the invention, when the polar aprotic solvent is added to the reaction medium sequentially to the cooling step, the addition is carried out after the step of cooling the reaction medium to a temperature below 0° C.

The reaction medium is maintained at cooled temperature for a period of time sufficient for the propagation of the α-methylstyrene polymerization to take place starting from the initiated living diene chains. This period is easily accessible to those skilled in the art and may for example be at least 4 hours.

According to the method of embodiments of the invention, the degree of conversion of the α-methylstyrene can reach at least 80%, or even at least 90%.

Those skilled in the art will understand that an advantage of the method of embodiments of the invention lies in the possibility of achieving a high degree of conversion of the α-methylstyrene when homopoly(α-methylstyrene) blocks are formed with a view to increasing the glass transition temperature of the thermoplastic blocks of a thermoplastic elastomer. However, this does not exclude the possibility, during this step 2., of copolymerizing with the α-methylstyrene at least one other monomer, chosen in particular from vinyl aromatic monomers, as long as the degree of conversion of the α-methylstyrene remains high and the glass transition temperature of the thermoplastic blocks remains in a temperature range compatible with the working temperature of the thermoplastic elastomer. This constitutes a particular implementation of embodiments of the method of the invention. The vinyl aromatic monomers may be as defined above, for instance styrene, ortho-, meta-, para-methylstyrene, the commercial mixture vinylmesitylene, divinylbenzene and vinylnaphthalene. This other monomer may be added to the reaction medium at the end of the step of polymerizing at least one diene monomer.

It is known to those skilled in the art that anionic polymerization is a polymerization sensitive to any protic presence. The extreme sensitivity of the active centres borne by the polymer chains to electrophilic impurities imposes a thorough purification of all the constituents of the reaction medium before they are used in the method. This thus involves the monomers or solvents, or even other compounds, used during the polymerization, such as randomizing agents, etc., these undergoing a purification by conventional methods known to those skilled in the art. For all the solutions, in particular of monomers, mention may be made of neutralization of the impurities prior to their use by reaction with an organolithium compound such as n-butyllithium. The solvents are, for their part, anhydrous and can also be purified by distillation.

At this stage, the method according to embodiments of the invention can be continued, in a manner known per se, by termination of the α-methylstyrene polymerization and recovery of the thermoplastic polymer.

According to variants of the invention, the termination can be carried out by adding a conventional stopping agent, in particular a protic compound such as water or an alcohol.

According to other variants of the invention, the termination can be carried out by modification of the chain end(s) of the thermoplastic polymer obtained by means of a functionalizing, coupling or star-branching agent well known to those skilled in the art. The modification is then carried out according to conventional procedures.

The variants of the various steps of the method of the invention can be combined with one another within the limit of their compatibility. Likewise, the particular or preferential aspects in one and the same variant or different variants can be combined with one another in so far as they are compatible.

The method according to embodiments of the invention has a productivity compatible with an economically cost-effective industrial production, in particular by making it possible to achieve a high degree of conversion of α-methylstyrene of at least 80%, or even of at least 90%. The method is also entirely reproducible.

The thermoplastic polymer obtained by means of this method has a homogeneous and controlled composition, that is to say that the chains of the polymer have Mn values close to one another. The polydispersity index of the thermoplastic polymer is controlled and reduced; it varies in particular from 1 to 1.5. The thermoplastic blocks of the polymer, composed of poly(α-methylstyrene), can have a high glass transition temperature, above that of polystyrene, in particular of at least 110° C., or even around 170° C. This glass transition temperature is dependent on the length of the thermoplastic blocks.

According to variants of the invention, the elastomer block of the thermoplastic elastomer has a number-average molecular weight, Mn, of at least 50 000.

According to variants of the invention, the elastomer block of the thermoplastic elastomer has a glass transition temperature of between 0° C. and −70° C. and more particularly between −10° C. and −60° C.

According to variants of the invention, the elastomer block of the thermoplastic elastomer is free of any α-methylstyrene unit.

According to variants of the invention, the poly(α-methylstyrene) block has a number-average molecular weight, Mn, of at least 5 000.

According to variants of the invention, the poly(α-methylstyrene) block has a glass transition temperature of more than 100° C., preferably of at least 110° C.

These variants can be combined with one another.

The thermoplastic elastomer prepared according to embodiments of the method of the invention may, according to certain variants, be diblock, composed of an elastomer block and of a thermoplastic block. This is the case in particular with polymers obtained by means of a polymerization initiator having a single active bond. The living diene elastomer has only one active site and just one chain end which initiates the α-methylstyrene polymerization. According to particular implementations of these variants, the thermoplastic elastomer may comprise, at the end of the diene elastomer block, a function that would result from a polymerization initiator having a single active bond comprising such a function, such as a lithium amide for example.

According to other variants of the invention, the thermoplastic elastomer obtained may be multiblock, composed of a central elastomer block and of at least two thermoplastic blocks. This is the case in particular with polymers obtained by means of a polymerization initiator having several active bonds. The living diene elastomer then has at least two active sites, one at each chain end, which initiate the α-methylstyrene polymerization. According to these variants, the thermoplastic polymer is preferably triblock, composed of a central elastomer block and of two side thermoplastic blocks. It may result from initiation by means of a bifunctional polymerization initiator, such as an organolithium compound having two carbon-lithium bonds.

According to yet other variants of the invention, the thermoplastic elastomer obtained may be multiblock, composed of at least two elastomer blocks and of at least one thermoplastic block. Polymers of this type are mainly obtained when the termination of the α-methylstyrene polymerization is carried out by adding a coupling or star-branching agent, regardless of whether the polymerization is initiated by an initiator having a single active bond or several active bonds.

According to yet other variants of the invention, the thermoplastic polymer obtained may be functionalized at the chain end or within the chain, depending on the nature of the agent which provides the function, whether this is the polymerization initiator or else the stopping agent.

Thus, it should be understood that, depending on the type of anionic polymerization initiator used and depending on the termination of the α-methylstyrene polymerization, the copolymer may be functionalized or non-functionalized and may be linear or star-shaped or may form a three-dimensional network comprising at least one [polydiene-poly(α-methylstyrene)] sequence.

The block thermoplastic diene copolymers in accordance with embodiments of the invention can advantageously be used in thermoplastic rubber compositions for the production of certain objects subjected in particular to specific working conditions where the temperatures exceed 100° C. Applications as varied as hot-filled containers, sterilisable packagings, adhesive compositions, tires, road surfaces or roofing in particular come to mind.

Rubber compositions for application to tires for motor vehicles are also part of the subject of the invention. These rubber compositions comprise at least one block thermoplastic diene copolymer obtained by means of the synthesis method according to embodiments of the invention. This block copolymer then more particularly consists of at least one elastomer block selected from a polybutadiene or a butadiene copolymer. Such a copolymer is preferentially a butadiene-styrene copolymer, and in particular those having a styrene content of at least 5% by weight, particularly of at least 20% by weight, and of at most 50% by weight, particularly of at most 40% by weight.

This block copolymer may be used as a blend with at least one or more elastomers conventionally used in rubber compositions for tires and selected from natural rubber, synthetic diene elastomers, which are optionally coupled and/or star-branched and/or else partially or completely functionalized, synthetic elastomers other than dienes, or even polymers other than elastomers.

These compositions can also comprise one or more additives usually present in rubber compositions in particular intended for motor vehicle tires. By way of usual additives, mention may for example be made of reinforcing fillers selected from carbon blacks and other, organic and inorganic, reinforcing fillers of siliceous type, in particular silica, and also mixtures of these fillers, rubber/filler bonding agents, non-reinforcing fillers, processing agents, stabilizers, plasticizing agents, pigments, antioxidants, anti-fatigue agents, antiozonant waxes, adhesion promoters, reinforcing resins, plasticizing resins, crosslinking systems based either on sulfur and/or on peroxide and/or on bismaleimides, crosslinking activators comprising zinc monoxide and steric acid, guanidine derivatives, extender oils, covering agents for silica.

The abovementioned characteristics of the present invention, and also others, will be understood more clearly on reading the following description of several examples of implementation of the invention, given by way of nonlimiting illustration.

EXAMPLES OF IMPLEMENTATION OF THE INVENTION

Measurements Used in the Examples
The elastomers are characterized as indicated below.
Size Exclusion Chromatography
Size exclusion chromatography or SEC is used. SEC makes it possible to separate macromolecules in solution according to their size through columns filled with a porous gel. The macromolecules are separated according to their hydrodynamic volume, the bulkiest being eluted first.

Without being an absolute method, SEC makes it possible to understand the distribution of the molar masses of a polymer. On the basis of commercial standard products, the various number-average (Mn) and weight-average (Mw) molar masses can be determined and the polydispersity index (PDI=Mw/Mn) can be calculated via calibration known as Moore's calibration.

Polymer preparation: there is no specific treatment of the polymer sample before analysis. Said sample is simply dissolved, in tetrahydrofuran+1 vol % of distilled water, at a concentration of approximately 1 g/l. The solution is then filtered through a filter with a porosity of 0.45 μm, before injection.

SEC analysis: the equipment used is a "Waters Alliance" chromatograph. The elution solvent is tetrahydrofuran. The flow rate is 0.7 ml/min, the temperature of the system is 35° C. and the duration of analysis is 90 min. A set of four Waters columns in series, having the trade names "Styragel HMW7", "Styragel HMW6E" and, for two of them, "Styragel HT6E", is used.

The injected volume of the solution of polymer sample is 100 μl. The detector is a "Waters 2410" differential refractometer and the chromatographic data processing software is the "Waters Empower" system.

The average molar masses calculated are relative to a calibration curve prepared using "PSS Ready Cal-Kit" commercial polystyrene standards.
Nuclear Magnetic Resonance Spectroscopy
The amounts of the various monomer units and the microstructures thereof within the copolymer are determined by NMR analysis. The spectra are acquired on a Bruker 500 MHz spectrometer equipped with a BBIz-grad 5 mm "broad band" probe. The quantitative $^1$HNMR experiment uses a 30° single pulse sequence and a repetition time of 5 seconds between each acquisition. The samples are dissolved in $CDCl_3$.

Example 1

Synthesis of a poly(α-methylstyrene)-polybutadiene-poly(α-methylstyrene) Triblock Thermoplastic Polymer
$1^{st}$ Step: Polymerization of Butadiene
80 ml of methylcyclohexane sparged beforehand with nitrogen for 10 minutes are introduced into a Steinie bottle. 15 ml of butadiene (i.e. 9.6 g, 0.178 mol) are then introduced. The impurities present in the reaction medium are neutralized with a solution of n-BuLi at 0.1 mol/l. The reaction is then initiated by adding $2.74 \times 10^4$ mol of bifunctional initiating agent such as 1,3-diisopropylbenzenedilithium at 0.48 mol/l. The polymerization is carried out at 60° C. for 45 minutes so as to reach 100% of butadiene conversion.
$2^{nd}$ Step: Polymerization of α-methylstyrene
The α-methylstyrene is purified on $Al_2O_3$. Before use, 1% v/v of THF is introduced into the α-methylstyrene solution and the remaining impurities are neutralized with n-BuLi at 0.1 mol/l. The neutralization of the impurities is confirmed by the changing of the colour to yellow-orange. 6.85 g of α-methylstyrene (0.058 mol) of the purified solution are added to the solution of polybutadienyldilithium at 25° C. for 2 h. 12 ml of distilled THF are then added to the reaction mixture, the reaction medium is cooled to −25° C. and the reaction is left to stir for 24 h. A degree of conversion of 83% of α-methylstyrene is achieved.
Termination:
The polymerization is stopped with methanol and 0.5 part per one hundred parts of elastomer (phr) of a 4,4'-methylenebis-2,6-tert-butylphenol and N-(1,3-dimethylbutyl)-N'-phenyl-p-phenylenediamine antioxidant solution (80%/20%) is added. The polymer is dried by stoving under vacuum (200 torr) at 60° C. for 48 h.
Analysis:
The block copolymer is analysed by NMR spectroscopy and size exclusion chromatography. The block copolymer has a total average molar mass of Mn=84000 g/mol and a polydispersity (PDI)=1.19 (determined by size exclusion chromatography). The block copolymer consists of 34.6% by weight of α-methylstyrene (determined by NMR spectroscopy).

Example 2

Synthesis of a poly(α-methylstyrene)-polybutadiene-poly(α-methylstyrene) Triblock Thermoplastic Polymer
$1^{st}$ Step: Polymerization of Butadiene
4340 ml of methylcyclohexane, sparged beforehand with nitrogen for 10 minutes, are introduced into a 10 l reactor. 803 ml of butadiene (522 g, 9.67 mol) are then introduced. The impurities present in the reaction medium are neutralized with a solution of n-BuLi at 0.1 mol/l. The reaction is then initiated by adding $11588 \times 10^{-6}$ mol of bifunctional initiator such as 1,3-diisopropylbenzenedilithium at 0.48 mol/l. The polymerization is carried out at 60° C. for 45 minutes so as to achieve 100% conversion of butadiene.
$2^{nd}$ Step: Polymerization of α-methylstrene
The α-methylstyrene is purified on $Al_2O_3$. Before use, 1% v/v of THF is introduced into the α-methylstyrene solution and the remaining impurities are neutralized with n-BuLi at 0.1 mol/l. The neutralization of the impurities is confirmed by a changing of the colour to yellow-orange. 376 g of α-methylstyrene (3.18 mol) of the purified solution are added to the polybutadienyldilithium solution at 25° C. for 2 h. 781 ml of distilled THF are then added to the reaction mixture then the reaction medium is cooled to −25° C. and the reaction is left for 24 h. A degree of conversion of 93% of α-methylstyrene is achieved.

Termination:

The polymerization is stopped with methanol and 0.5 part per hundred parts of elastomer (phr) of a 4,4'-methylenebis-2,6-tert-butylphenol and N-(1,3-dimethylbutyl)-N'-phenyl-p-phenylenediamine antioxidant solution (80%/20%) is added. The polymer is dried by stoving under vacuum (200 torr) at 60° C. for 48 h.

Analysis:

The block copolymer is analysed by NMR spectroscopy and size exclusion chromatography. The block copolymer has a total average molar mass of Mn=77500 g/mol and a polydispersity (PDI=1.13 (determined by size exclusion chromatography). The block copolymer consists of 39.3% by weight of α-methylstyrene (determined by NMR spectroscopy).

The invention claimed is:

1. A method for synthesizing a thermoplastic elastomer comprising at least one polydiene block and at least one other poly(α-methylstyrene) block, wherein the method comprises the following steps:
   1. polymerizing at least one diene monomer in a starting reaction medium comprising an anionic polymerization initiator and an aprotic non-polar solvent to obtain a living polydiene chain;
   2. polymerizing α-methylstyrene to the living polydiene chain obtained in the preceding step comprising:
      a. at the end of the polymerization of step 1., maintaining a reaction medium containing the living polydiene chain obtained previously and α-methylstyrene at a temperature above 20° C. and below the ceiling temperature for the polymerization of α-methylstyrene for at least one minute;
      b. cooling the reaction medium obtained at the end of the preceding step a., to a temperature below 0° C.;
      c. simultaneously, successively or prior to the cooling step, adding a purified aprotic polar solvent to the reaction medium with a volume ratio of the polar solvent to the non-polar solvent of less than 1; and
      d. propagating the polymerization of α-methylstyrene to the living polydiene chain;
   3. terminating the polymerization and recovering the thermoplastic polymer.

2. A method according to claim 1, wherein the diene monomer is butadiene.

3. A method according to claim 1, wherein, during step 1, the diene monomer is copolymerized with another monomer.

4. A method according to claim 3, wherein the other monomer is styrene.

5. A method according to claim 1, wherein the anionic polymerization initiator is an organometallic compound comprising at least one carbon-alkali metal bond.

6. A method according to claim 1, wherein the anionic polymerization initiator is monofunctional.

7. A method according to claim 1, wherein the anionic polymerization initiator is polyfunctional.

8. A method according to claim 7, wherein the anionic polymerization initiator is bifunctional.

9. A method according to claim 8, wherein the anionic polymerization initiator is 1,3-diisopropylbenzenedilithium.

10. A method according to claim 1, wherein the α-methylstyrene is a purified α-methylstyrene monomer that is added to the reaction medium at the end of the polymerization of at least one diene monomer of step 1.

11. A method according to claim 1, wherein, in step 2.a., the reaction medium comprising the living polydiene is maintained at ambient temperature in the presence of α-methylstyrene.

12. A method according to claim 1, wherein the cooling of step 2.b. is carried out at a temperature ranging from −10° C. to −40° C.

13. A method according to claim 1, wherein the aprotic polar solvent is selected from thioethers and ethers.

14. A method according to claim 13, wherein the aprotic polar solvent is tetrahydrofuran.

15. A method according to claim 1, wherein the purified aprotic polar solvent is introduced into the reaction medium before the cooling step.

16. A method according to claim 1, wherein the purified aprotic polar solvent is introduced into the reaction medium after the cooling step.

17. A method according to claim 1, wherein the volume ratio of the polar solvent to the non-polar solvent is less than 1/3.

18. A method according to claim 1, wherein, during step 2, the α-methylstyrene monomer is copolymerized with another monomer.

19. A method according to claim 1, wherein at the end of the polymerization of step 1, the reaction medium containing the living diene elastomer and α-methylstyrene is maintained at a temperature above 20° C. and below the ceiling temperature for at least fifteen minutes for the polymerization of α-methylstyrene.

20. A method according to claim 1, wherein at the end of the polymerization of step 1, the reaction medium containing the living diene elastomer and α-methylstyrene is maintained at a temperature above 20° C. and below the ceiling temperature for at least one hour for the polymerization of α-methylstyrene.

* * * * *